United States Patent [19]

Heald et al.

[11] 4,270,917

[45] Jun. 2, 1981

[54] STABILIZED AQUEOUS DYESTUFF DISPERSIONS

[75] Inventors: Terence E. Heald; Roy Porter, both of Manchester, England

[73] Assignee: Imperial Chemical Industries Limited, London, England

[21] Appl. No.: 81,057

[22] Filed: Oct. 2, 1979

[30] Foreign Application Priority Data

Oct. 16, 1978 [GB] United Kingdom ............... 40703/78

[51] Int. Cl.³ ............................................. D06P 67/00
[52] U.S. Cl. ........................................... 8/527; 8/584; 8/613; 8/908
[58] Field of Search ....................... 8/84, 86, 89 R, 93, 8/527, 584, 908

[56] References Cited

U.S. PATENT DOCUMENTS

| 3,097,047 | 7/1963 | Weinstein et al. ....................... 8/900 |
| 3,728,078 | 4/1973 | Freshwater et al. .................... 8/617 |
| 3,787,181 | 1/1974 | Dellian et al. ........................... 8/617 |

FOREIGN PATENT DOCUMENTS

| 53-6689 | 1/1978 | Japan . |
| 1333843 | 10/1973 | United Kingdom . |
| 1356885 | 6/1974 | United Kingdom . |
| 1410232 | 10/1975 | United Kingdom . |

*Primary Examiner*—A. Lionel Clingman
*Attorney, Agent, or Firm*—Cushman, Darby & Cushman

[57] ABSTRACT

Aqueous dispersions of dyestuffs which are susceptible to crystal growth of the dyestuff particles in the dispersion, stabilized against such crystal growth by addition to the dispersion of a phosphated alkylphenol ethoxylate.

8 Claims, No Drawings

STABILIZED AQUEOUS DYESTUFF DISPERSIONS

This invention relates to aqueous dyestuff dispersions and more particularly to such dispersions which are stabilised against crystal growth of the dyestuff particles by the use of certain additives.

Disperse dyestuffs are frequently marketed in the form of aqueous dispersions which are prepared by milling the solid dyestuff in water together with dispersing agents, for example, the ammonium and alkali metal, e.g. potassium and especially sodium salts of lignin sulphonic acids, anionic polyelectrolytes such as the alkali metal, e.g. potassium and especially sodium salts of aromatic hydrocarbon/formaldehyde or phenol/formaldehyde condensates containing sulphonic acid groups, for example, the condensation products of naphthalene-2-sulphonic acid and formaldehyde, and the products obtained by condensation of phenol, formaldehyde and sodium sulphite in the presence of sodium hydroxide. Mixtures of different dispersing agents may be used, for example, when necessary to obtain adequate dispersibility.

The majority of disperse dyestuffs give aqueous dispersions having satisfactory stability when prepared by these conventional methods, and are not susceptible to crystal growth of the dyestuff particles and consequent flocculation of the dispersion even when stored for several weeks or even months at normal room temperatures.

However, certain dyestuffs are very susceptible to crystal growth in aqueous dispersions prepared as described above, and storage-stable dispersions cannot be obtained in such cases.

It has now been found that stable aqueous dispersions of dyestuffs which are susceptible to crystal growth of the dyestuff particles in the dispersion may be obtained by preparing the dispersion in the presence of certain dispersing agents which are esters of phosphoric acid.

According to the present invention there are provided storage-stable aqueous dispersions of disperse dyestuffs which are susceptible to crystal growth of the dyestuff particles in the dispersion, the aqueous dispersions containing from 1% to 100% by weight based on the weight of dyestuff of a phosphated alkylphenol ethoxylate having the general formula:

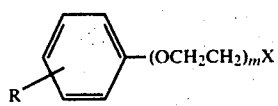

wherein R represents a straight chain or branched alkyl radical containing from 5 to 20 carbon atoms, X represents $OPO_2HM$ or $OPO_3M_2$ in which M is an alkali metal, ammonium or quaternary ammonium ion, and m is an integer from 1 to 34.

Examples of the alkyl radicals represented by R are octyl, nonyl and dodecyl.

Examples of the alkali metal ions represented by M are the potassium ion and especially the sodium ion.

An example of a quaternary ammonium ion represented by M is the tetramethylammonium ion.

Specific examples of phosphated alkylphenol ethoxylates which may be used are compounds of the above formula in which R is nonyl, X is $-OPO_3H_2$ and m is 10.

Phosphated alkylphenol ethoxylates may be obtained by reaction of the alkylphenol ethoxylates, which are commercially available products, with phosphorus oxychloride to give compounds of the above formula in which X is $-O.P(:O)Cl_2$, followed by hydrolysis to give the compounds of the above formula in which X is $-O.P(:O)(OH)_2$. These latter compounds are in the free acid form and are converted into an appropriate alkali metal, ammonium or quaternary ammonium salt, either before being used in the preparation of a dispersion or in the dispersion.

The phosphated alkylphenol ethoxylate may also be obtained by reaction of the alkylphenol ethoxylates with phosphorus pentoxide.

An amount of phosphated alkylphenol ethoxylate from 4.5 to 100% by weight, based on the weight of disperse dyestuff, is in general effective in providing a stable aqueous dispersion.

The phosphated alkylphenol ethoxylate may be used alone or in combination with conventional dispersing agents, for example, those agents disclosed above.

The aqueous dispersions may be prepared by milling the disperse dyestuff, conveniently in the form of the aqueous paste directly resulting from its process of manufacture, with water, the phosphated alkylphenol ethoxylate and sufficient alkali, for example, an alkali metal or quaternary ammonium hydroxide, to give an essentially neutral mixture, optionally together with conventional dispersing agents and other additives, for example, a humectant and antifreeze such as glycerol and a preservative, such as sodium o-phenylphenate, against the infection of the dispersion by micro-organisms, the milling being conducted until the particle size of the dyestuff is in the desired range. This process constitutes a further feature of the invention.

The phosphated alkylphenol ethoxylate may be neutralised as indicated above before its addition to the dyestuff, water and optional ingredients.

A dyestuff particle size from 1 to 3 microns after milling is generally satisfactory. The amount of dyestuff in the aqueous dispersion will generally be from 10 to 40% by weight based on the weight of the dispersion.

Any conventional method of milling may be used in preparing the aqueous dyestuff dispersions, for example, ball milling, gravel milling and, preferably, high speed milling using sand or glass beads (for example, having a diameter from 0.3 to 0.5 mm) as comminuting agent. In the latter case external cooling of the milling vessel may be necessary in order to dissipate the heat which is generated in the milling operation.

Specific examples of dyestuffs which give stable aqueous dispersions when the latter are prepared with the aid of a phosphated alkylphenol ethoxylate but which give unstable aqueous dispersions with conventional dispersing agents are 4-(2′-bromo-4′,6′-dinitrophenylazo)-3-acetylamino-N,N-diethylaniline and 4-(3′,5′-dinitrothien-2′-ylazo)-3-acetylamino-N,N-diethylaniline.

The invention is illustrated but not limited by the following Examples in which parts and percentages are by weight.

EXAMPLE 1

158.7 Parts of a disperse dyestuff paste containing 33 parts of the dyestuff 4-(3′,5′-dinitrothien-2′-ylazo)-3-acetylamino-N,N-diethylaniline and 125.7 parts of water, together with 6.6 parts of the sodium salt of a sulphonated modified Kraft lignin, obtainable from Westvaco Chemicals Division under the name 'Reax 85A' (Reax" is a Registered Trade Mark), 6.6 parts of a phosphated nonylphenol ethoxylate containing an average of 10 ethylene oxide units, 51.8 parts of glycerol and 0.6 parts of sodium o-phenylphenate are stirred together in a stainless steel water-cooled vessel with an additional 201.4 parts of water, the pH being adjusted to 7.5±0.1 by the addition of 5.4 parts of 20% w/w sodium hydroxide solution. The stirrer consists of two parallel, axially aligned stainless steel discs mounted 25 mm apart on a common stainless steel shaft, each disc being 140 mm in diameter and 9 mm in thickness.

900 Parts of glass beads having a diameter of 0.35 to 0.55 mm are added and the mixture is stirred for 30 minutes at 1880 revolutions per minute, after which the dispersion is separated from the glass beads.

The dispersion so obtained is fluid and deflocculated, the majority of the dyestuff particles having a diameter below 3 microns.

Storage of the dispersion for at least one calendar month reveals no crystal growth of the dyestuff particles.

A similar milling containing 16.5 parts of Reax 85A, no phosphated nonylphenol ethoxylate and 16.7 parts of glycerol (to maintain a 20% aqueous glycerol continuous phase) displays growth of needle-like crystals having a length of 40–50 microns after 3 days storage.

EXAMPLE 2

49.3 Parts of a disperse dyestuff paste containing 19.8 parts of the dyestuff 4-(2'-bromo-4',6'-dinitrophenylazo)-3-acetylamino-N,N-diethylaniline and 29.5 parts of water, together with 9 parts of Reax 85A, 9 parts of the same phosphated nonylphenol ethoxylate as used in Example 1, are stirred together in a stainless steel water-cooled vessel with an additional 52.7 parts of water, the pH being adjusted to 7.5±0.1 by the addition of 4.4 parts of 20% w/w aqueous sodium hydroxide solution. The stirrer consists of three parallel, axially aligned stainless steel discs mounted 25 mm apart on a common stainless steel shaft, each disc being 60 mm in diameter and 8 mm in thickness. 360 Parts of glass beads having a diameter of 0.35 to 0.5 mm are added and the mixture is stirred for 30 minutes at 3000 revolutions per minute, after which the dispersion is separated from the glass beads.

The dispersion is fluid and deflocculated, the majority of the dyestuff particles having a diameter below 3 microns.

Storage of the dispersion for one calendar month reveals no crystal growth of the dyestuff particles.

A similar milling in which all of the phosphated nonylphenol ethoxylate is replaced by an equal weight of Reax 85A displays growth of needle like crystals after 3 days storage.

EXAMPLES 3–11

The procedure described in Example 1 was repeated except that the amounts of the phosphated nonylphenol ethoxylate and Reax 85A used in that Example were replaced by the amounts of these additives given in the following table, expressed as a percentage of the weight of dyestuff. The base which is used to adjust the pH of the dispersion to 7.5±0.1 is given in the final column of the table.

| Example | Phosphated nonylphenol ethoxylate (as used in Example 1). (% based on weight of dyestuff) | Reax 85A % based on weight of dyestuff | Base |
|---|---|---|---|
| 3 | 1.8 | 48.2 | NaOH |
| 4 | 3.6 | 46.4 | " |
| 5 | 5.5 | 44.5 | " |
| 6 | 7.3 | 42.7 | " |
| 7 | 10.0 | 40.0 | " |
| 8 | 60.0 | — | " |
| 9 | 20.0 | 20.0 | KOH |
| 10 | 20.0 | 20.0 | NH$_4$OH |
| 11 | 20.0 | 20.0 | triethanolamine |

In each case there was no crystal growth of dyestuff particles after storage of the dispersion for at least one calendar month after preparation.

EXAMPLE 12

The procedure described in Example 1 was repeated except that the phosphated nonylphenol ethoxylate used therein was replaced by a phosphated nonylphenol ethoxylate containing an average of 4 ethylene oxide units, in an amount of 20% of the weight of dyestuff, and the amount of Reax 85A was increased to 36.4% of the weight of dyestuff. Sodium hydroxide was used to neutralise the mixture.

Storage of the resulting dispersion for at least one calender month revealed no crystal growth of the dyestuff particles.

EXAMPLE 13

The procedure described in Example 12 was repeated except that the phosphated nonylphenol ethoxylate containing an average of 4 ethylene oxide units was replaced by a phosphated nonylphenol ethoxylate containing an average of 5 ethylene oxide units.

A similar result was obtained.

EXAMPLE 14

The procedure described in Example 12 was repeated except that the phosphated nonylphenol ethoxylate containing an average of 4 ethylene oxide units was replaced by a phosphated nonylphenol ethoxylate containing an average of 8 ethylene oxide units.

A similar result was obtained.

EXAMPLE 15

The procedure described in Example 12 was repeated except that the phosphated nonylphenol ethoxylate containing an average of 4 ethylene oxide units was replaced by a phosphated nonylphenol ethoxylate containing an average of 10 ethylene oxide units.

A similar result was obtained.

EXAMPLE 16

The procedure described in Example 12 was repeated except that the phosphated nonylphenol ethoxylate containing an average of 4 ethylene oxide units was replaced by a phosphated nonylphenol ethoxylate containing an average of 14 ethylene oxide units.

A similar result was obtained.

We claim:

1. Storage-stable aqueous dispersions of disperse dyestuffs which are susceptible to crystal growth of the dyestuff particles in the dispersion, the aqueous dispersions containing from 1% to 100% by weight based on the weight of dyestuff of a phosphated alkylphenol ethoxylate having the general formula:

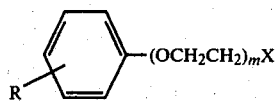

wherein R represents a straight chain or branched alkyl radical containing from 5 to 20 carbon atoms, X represents $OPO_3HM$ or $OPO_3M_2$ in which M is an alkali metal, ammonium or quaternary ammonium ion, and m is an integer having an average from 1 to 14.

2. Dispersions as claimed in claim 1 wherein in the phosphated alkylphenol ethoxylate R is nonyl, X is $-OPO_3H_2$ and m is 10.

3. Dispersions as claimed in claim 1 wherein the amount of phosphated alkylphenol ethoxylate is from 4.5 to 100% by weight based on the weight of disperse dyestuff.

4. Dispersions as claimed in claim 1 which also contain conventional dispersing agents.

5. Dispersions as claimed in claim 1 wherein the particle size of the disperse dyestuff is from 1 to 3 microns.

6. Dispersions as claimed in claim 1 which contain from 10 to 40% by weight of disperse dyestuff based on the weight of the dispersion.

7. Dispersions as claimed in claim 1 wherein the disperse dyestuff is 4-(2'-bromo-4',6'-dinitrophenylazo)-3-acetylamino-N,N-diethylaniline.

8. Dispersions as claimed in claim 1 wherein the disperse dyestuff is 4-(3',5'-dinitrothien-2'-ylazo)-3-acetylamino-N,N-diethylaniline.

* * * * *